A. J. BOWIE, Jr.
ELECTROMAGNETIC POWER TRANSMITTING MECHANISM.
APPLICATION FILED APR. 18, 1907.
982,789.
Patented Jan. 31, 1911.
4 SHEETS—SHEET 1.
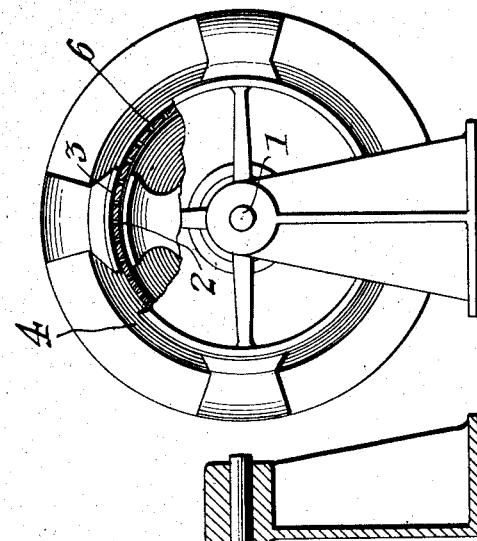
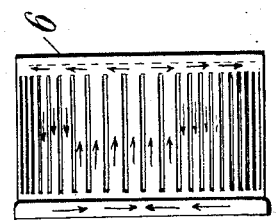
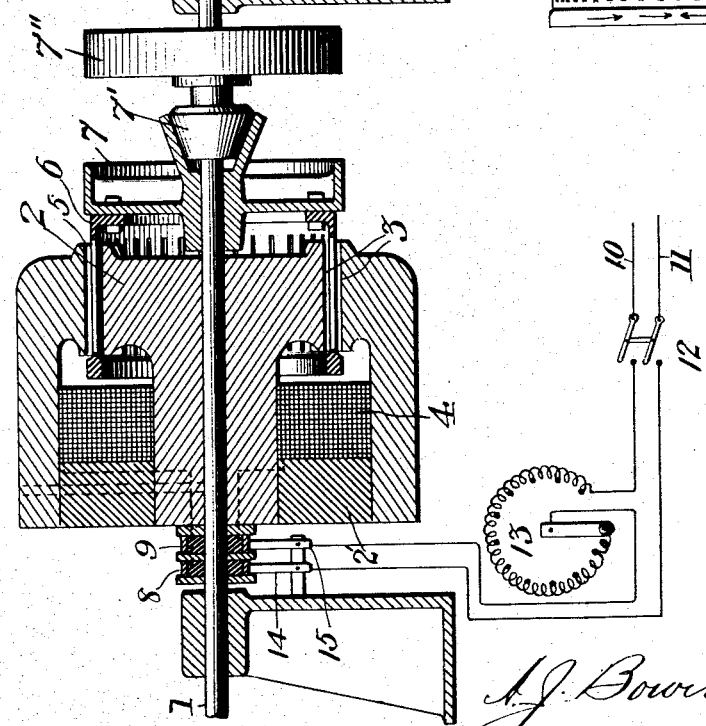

A. J. BOWIE, Jr.
ELECTROMAGNETIC POWER TRANSMITTING MECHANISM.
APPLICATION FILED APR. 18, 1907.
982,789.
Patented Jan. 31, 1911
4 SHEETS—SHEET 2.
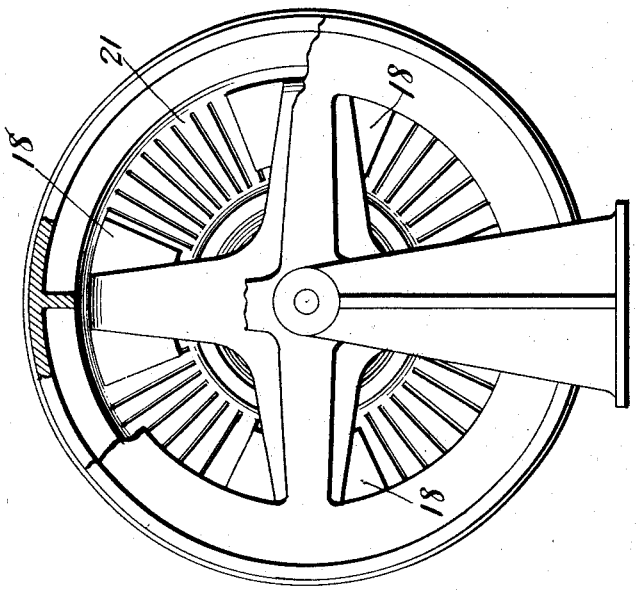
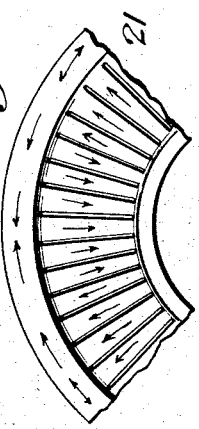
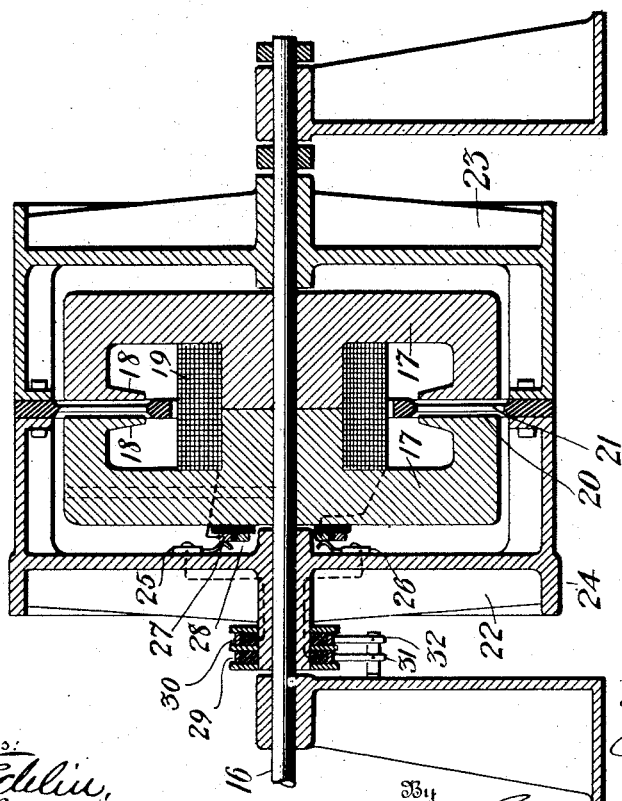

A. J. BOWIE, Jr.
ELECTROMAGNETIC POWER TRANSMITTING MECHANISM.
APPLICATION FILED APR. 18, 1907.
982,789.
Patented Jan. 31, 1911.
4 SHEETS—SHEET 3.
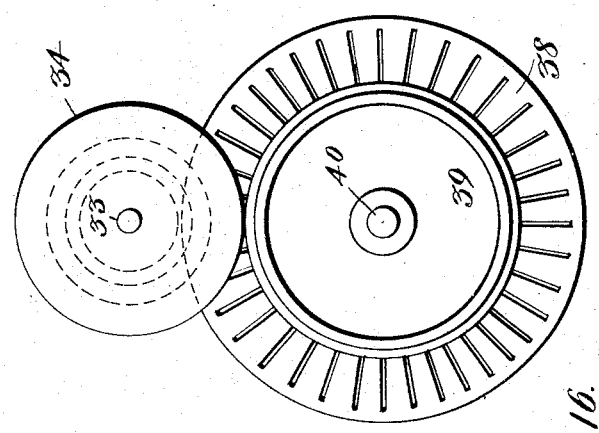
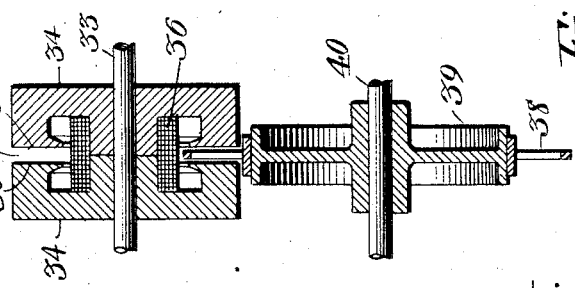
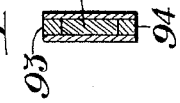
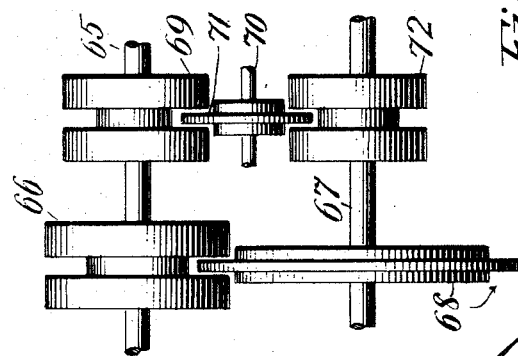
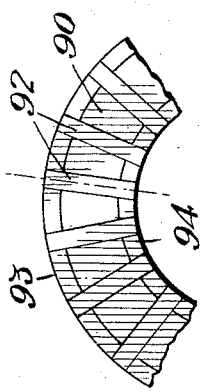

A. J. BOWIE, Jr.
ELECTROMAGNETIC POWER TRANSMITTING MECHANISM.
APPLICATION FILED APR. 18, 1907.
982,789.
Patented Jan. 31, 1911.
4 SHEETS—SHEET 4.
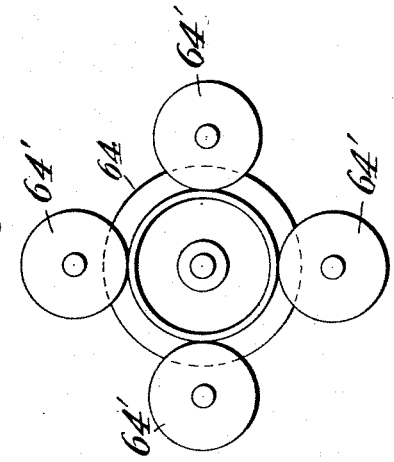
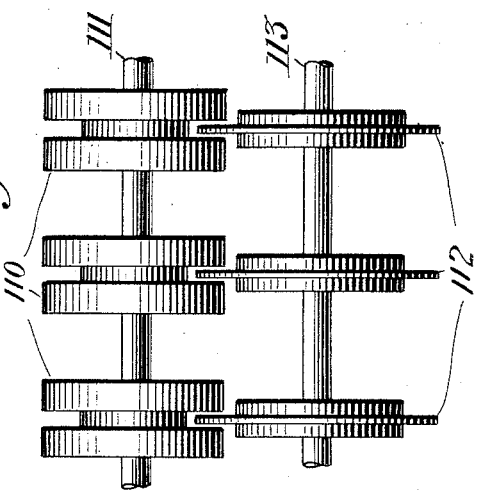
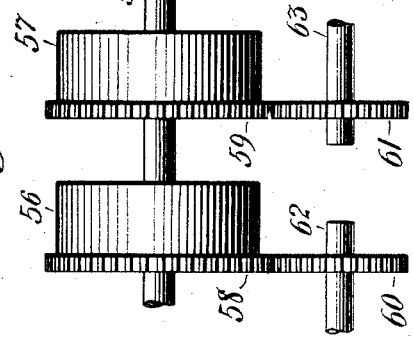
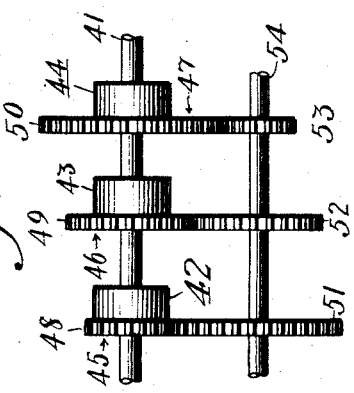
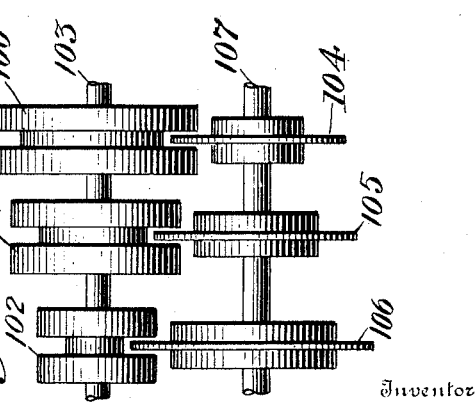

UNITED STATES PATENT OFFICE.

AUGUSTUS JESSE BOWIE, JR., OF SAN FRANCISCO, CALIFORNIA.

ELECTROMAGNETIC POWER-TRANSMITTING MECHANISM.

982,789.      Specification of Letters Patent.     Patented Jan. 31, 1911.

Application filed April 18, 1907. Serial No. 368,950.

*To all whom it may concern:*

Be it known that I, AUGUSTUS J. BOWIE, Jr., a citizen of the United States, residing in San Francisco, county of San Francisco, State of California, have invented certain new and useful Improvements in Electromagnetic Power-Transmitting Mechanism; and I do hereby declare the following to be a full, clear, and exact description of the invention, such as will enable others skilled in the art to which it appertains to make and use the same.

The invention relates to electro-magnetic transmitting mechanism characterized by a positively operated driving member and a driven member in inductive relation to the driving member, one of said members being provided with an electric winding to generate a magnetic field in which the other member operates, whereby movement of the driving member will develop a certain stress or pressure in the driven member serving to move the latter.

The primary objects of the invention are to provide a simple and efficient power transmitting mechanism, which affords great flexibility and ready control and practically eliminates vibration and wear between the parts.

In the accompanying drawings:—Figure 1 is a longitudinal section of one form of machine embodying the invention; Fig. 2 is an end view thereof, partly in section; Fig. 3 is a side elevation of the rotary driven member; Fig. 4 is a longitudinal section of a modified form of the invention; Fig. 5 is an end view, partly in section of the machine shown in Fig. 4; Fig. 6 is a fragmentary view of the rotary driven member; Fig. 7 is a longitudinal section of a modification in which the driving and driven members are mounted upon parallel shafts; Fig. 8 is an end view thereof; Fig. 9 shows in side elevation an application of the invention to a change or multiple speed gear; Fig. 10 is a similar view of a modified form of multiple speed transmission; Fig. 11 illustrates, in side elevation, the application of the invention for differential driving; Fig. 12 shows, in end view, the employment of multiple driving members with a single driven member; Fig. 13 shows the application of multiple transmission mechanisms uniting two lines of shafting; Fig. 14 illustrates the application of the invention for reversing the direction of the driven shaft; Figs. 15, 16, and 17 are details of a modified form of the disk or rotor.

The ordinary forms of power transmission gear employ mechanical contact to transmit power from a prime mover to the driven element or secondary mover, and this transmission is usually effected by shafting, positive clutches, positive gears, belting, or friction clutches, which last allow the secondary element to be gradually brought up to speed by rubbing contact between the surfaces of the clutch members. In all of these forms of transmission mechanism, and more particularly in the case of friction clutches and gearing, the unavoidable wear on the parts presents a serious difficulty and the mechanism is generally lacking in flexibility and tends to take up and transmit vibrations, which increases the wear on the parts in contact and also detracts from the efficiency of all of the mechanism on both sides of the transmission devices. Moreover, the older types of power mechanism all involve considerable difficulty and the employment of much energy in the control thereof, to wit, in throwing them in and out of commission and changing from one speed to another. The present invention, as hereinbefore indicated, is intended to obviate these difficulties and to provide a transmission system which is absolutely independent of mechanical contact, and therefore devoid of wear, which possesses great flexibility without liability to vibration and is capable of absolute control with a minimum expenditure of energy and without the usual sudden jar or shock which characterizes the change of condition in the ordinary types of transmission mechanism. Furthermore, the invention contemplates the provision of transmission mechanism which will possess the advantageous characteristics of all of the older forms of direct transmissions, whether they be of the clutch type or of the gear type.

When an electric conductor is moved in a magnetic field, across the lines of force, a difference of electrical pressure or potential between the ends of the conductor will be generated, said pressure or potential varying directly with the lines of force which the conductor cuts in a unit time. If, while the conductor is being moved, as described, its two ends be connected, by another conductor not moving in the field of force, a current will flow in the circuit so formed, the strength of which is determined by Ohm's law, viz., the current equals the voltage generated in the moving conductor, divided by the resistance of the circuit. Under these conditions of operation, power is required to move the conductor across or through the magnetic field, said power being substantially equal to the power generated in the electric circuit, less frictional losses. The present invention is based upon this principle of operation, and, in its fundamental aspect, the invention comprises a magnetic circuit having an air gap and a magnetizing coil and a conductor of appropriate shape and design inserted in the air gap. Obviously, either element of the system, as thus broadly outlined, may be either the primary or the secondary, to wit, the driving or the driven element, but in the description of the invention, to be hereinafter more specifically set forth, it will be assumed that the primary or driving element consists of the mechanism carrying a magnetic circuit, with the air gap and magnetizing coil, and the secondary or driven element is the conductor inserted in the air gap. While this broad designation is adapted for, in a measure, simplifying the description of the apparatus, it is to be distinctly understood that the reverse arrangement of the elements considered as driving or driven members may be employed, and is within the scope of the appended claims.

The primary element is driven by extraneous power applied thereto, and the secondary or driven element is so arranged, relative to the primary, that the rotatory magnet with its air gap, will generate a difference of electric pressure between certain parts of the secondary conductor. The design of the conductor and magnetic circuit is such as to provide a suitable return circuit for the current which will then flow in the conductor, and said return circuit is preferably arranged so that no voltage is generated therein, but, if desired, the construction may be such that a voltage is generated therein which may be made to increase the total voltage and hence the current. Under these conditions, the voltage developed will be proportional to the difference of speeds of the air gap magnet and the conductor. The circulation of current in the secondary conductor will cause the secondary element to exert a pull of P lbs. on the primary. This pull multiplied by the difference in the speed of the primary and secondary at the place where the voltage is generated will represent the energy of the circulating current. Since action and reaction are equal, the pull P will be transmitted to the secondary, and, if the latter moves, it will develop and deliver energy at a rate equal to the product of P and its linear velocity. In other words, if we consider the present case in which the conductor or secondary element runs in an air gap and the velocity of the prime mover is $V_1$ feet per second, and that of the secondary mover is $V_2$ feet per second, then $PV_1$ ft. lbs. per second equals the total energy or output of the prime mover, and $PV_2$ ft. lbs. per second equals the energy or output of the secondary mover, and $P(V_1-V_2)$ ft. lbs. per second equals the energy employed in the circulating current in the secondary, or, in other words, the lost energy. Thus, provided current may be made to flow within the secondary, the primary will drive the secondary, without mechanical connection, but with a certain slip, the velocity of the secondary being always somewhat less than that of the primary. It will be apparent that the apparatus may thus be employed as a clutch with a certain definite slip, which latter, by proper design, may be made as small or as large as desired, to suit the particular exigencies of any individual case.

Referring to Figs. 1, 2 and 3 of the drawing, 1 indicates a power shaft, which is driven from any suitable prime mover, and upon said shaft there is secured a magnet consisting of a central core having radial projections 2, a connecting yoke piece 2' from which extend pole pieces 3 having faces lying adjacent the corresponding faces on the arms 2 and producing air gaps between said faces. Mounted upon the core is a coil 4, the opposite ends of which are connected with slip rings 8 and 9, upon which bear conductor brushes 14 and 15, respectively, which are connected with leads 10 and 11 from any suitable source of electric power. The rheostat 13 is interposed in one of the leads to regulate the current delivered to the coil 4, and a switch 12 is employed to make and break the circuit. The energization of the magnetic coil causes magnetic currents or lines of force to be set up in the body of the magnet and to flow across the air gaps 5 between the pole faces. Mounted loosely on the shaft 1, concentric with said shaft and projecting within the air gaps, is the secondary conductor which is preferably and conveniently constructed as a cylinder 6, having its ends of enlarged or increased cross-sectional area and provided with a series of slots in its surface parallel to the axis. The slitted arrangement of the armature is designed to cut down eddy currents and to give direction to the electric current generated, while the increased cross sectional area of the cylinder provides an adequate conductor for the accumulated currents which flow therein from the metal of the cylinder included between the slits.

The magnet may be divided longitudinally in order to facilitate its mounting upon the shaft and the portions of said magnet may be rigidly connected together by any appropriate means. The pole pieces on the two halves of the magnet are preferably arranged opposite each other and alternate with blank spaces of about equal area. Secured to the cylinder 6, and constituting the support therefor is a pulley 7 loosely mounted on the shaft 1 and said pulley may constitute an element from which power is taken from the rotatory cylinder 6, which forms the secondary element of the transmission system. For transmitting small powers, a permanent magnet may be substituted for the electromagnet hereinbefore referred to.

The operation of the apparatus, as thus described, is substantially as follows:— When the secondary element 6 is at rest and the primary mover, viz., the electro-magnet, is being rotated by means of extraneous power applied to shaft 1, and switch 12 is closed, the secondary conductors of the drum or cylinder 6, formed by the metal between the successive slits therein, will be cut by lines of force passing between the poles of the magnet and will consequently have a definite electrical pressure generated therein. This pressure will in all cases be in the same direction, viz., parallel to the axis, and will cause current to flow in paths indicated generally in Fig. 3, to wit, along the portions of the cylinder defined by the slits, and moving through one air gap between the pole faces, thence through the enlarged end of the cylinder, and back through the portion of the cylinder not included between the pole faces, and thence passing through the next air gap in the series, through the other enlarged end of the cylinder to the place of beginning. The current generated under each pole will, of course, divide, part flowing each way through the enlarged ends, or in opposite circumferential directions. As hereinbefore explained, this flow of current in the secondary will cause the latter to rotate, and the energy of its rotation may be utilized by a belt placed upon pulley 7.

It will be noted that mechanism such as just described has practically all of the advantages of a friction clutch, as a means for transmitting energy, without, however, possessing the inherent objection to friction clutches incident to the great wear imposed upon the rubbing surfaces, which must, therefore, be made very large to allow for the consequent heating. Should it be desired to cut out this clutch like transmission mechanism, after the apparatus gets up to speed, without interfering with the operation of the primary or magnetic mover, a friction, or other mechanical clutch 7', may be associated with the pulley 7, in the manner shown in Fig. 1. The hub of the clutch 7' slides on a feather on the shaft, and through a lever or corresponding device may be made to engage the hub of 7, and then the magnetic clutch may be cut out. The clutch 7' may be made to operate by electric attraction if desired, in the manner commonly used for such work. Where the pulley 7 drives a load which is liable to run away, or when it is desired to stop the pulley quickly, a brake may be employed. In this event 7' will be rigidly attached to 7, and the pulley 7'' will be loose on the shaft. On the pulley 7'' is a brake. If desired this brake may be mechanically or electrically controlled, so as not to be released until current is turned on to coil 4, or until this current reaches a predetermined value, or else the releasing of the brake may throw current into coil 4; and also breaking the circuit through 4 may set the brake.

Current for the magnetic coil of the prime mover may be derived from an independent source, as hereinbefore indicated, or such current may be furnished by a generator of any preferred form attached to or driven from said prime mover, and, if desired, the magnetism of the prime mover itself may be used to produce a field for this current generator. In any of the arrangements indicated a rheostat or other convenient means may be employed to control the current flowing in the primary magnetic coil, so that the secondary may be started up gradually or its speed altered to any desired degree, while it is running. It will be noted that this control, dependent as it is upon the mere shifting of the rheostat, is exceedingly simple, and, inasmuch as the slip and the torque in the secondary mover are dependent on the strength of the primary magnet, the ready regulation of the latter by means of the rheostat affords a mode of control that is particularly advantageous where nice gradations of speed are desired.

In Figs. 4, 5 and 6 there is illustrated a modified form of power transmitting mechanism which differs in construction but not in mode of operation from that heretofore described. Referring to said figures, 16 indicates the shaft which is driven from a suitable source of power and keyed upon said shaft is an electro-magnet 17 provided with a central core and radial arms terminating in pole faces 18 which lie opposite each other in the two magnet halves and alternate with blank spaces. Mounted upon the central core is the magnet coil 19, the energization of which produces a magnetic flux in each of the air gaps 20, formed between the pole faces 18. Mounted loosely upon the shaft 16 and surrounding the magnet 17 is a generally cylindrical frame formed by spider-like members 22, 23, between which is rigidly secured a disk 21 which constitutes the secondary or driven member of the electro-magnetic transmission mechanism. Said disk 21 is provided with radial slots, to divide the surface of the disk into radial sections, which serve the same purpose as the sections in the cylinder 6, in the construction hereinbefore described. Said disk 21 is concentric with the magnet 17 and projects into and through the air gaps formed between the several pole faces 18, and the inner and outer peripheries of the disk are thickened or increased in cross-section to produce low resistance paths for the currents generated in said disk in a manner altogether similar to the arrangement hereinbefore described. The cylindrical member, which supports the disk 21 may conveniently constitute the support for the means for transmitting the power developed by the rotation of this disk, and in the present instance, this transmitting means is driving pulley 24, formed on one end of member 22. Current is supplied to the magnet coil 19 from insulated slip rings 29 and 30, which coöperate with the brushes 31 and 32 connected with a source of current supply, which slip rings are connected with brushes 26 and 25, respectively, on the spider-like member 24, which latter brushes bear upon insulated rings 27 and 28, respectively, concentric with the shaft 16 and secured to the side of magnet 17, said rings 27 and 28 being connected to the respective ends of the magnet coil 19.

When the magnet 17 is positively driven from a suitable source of power applied to the shaft 16 and current is passed through the coil 19 of said magnet, rotation of disk 21 is set up, under substantially the same conditions as rotation of the drum 6 is effected in the machine hereinbefore described. The direction of flow of the induced currents in disk 21 is graphically illustrated in Fig. 6. It will also be noted that the secondary element, to wit, the revolving cylinder formed by members 22 and 23, together with band pulley 24 may be modified to dispense with one of the spiders, viz., 22, so that the cylindrical member will overhang the magnet 17. Under these conditions, slip rings 28 and 29 may be connected directly to the respective ends of the magnet coil without the interposition of the brushes 25, 26 and contact rings 27 and 28.

The conductor of the secondary element may be of any desired metal or combinations of metals and may, if desired, be laminated. If the element be made of copper, a high degree of conductivity is obtained. By making it of iron or steel its strength is increased and the necessary magnetizing power is decreased and hence the size of the magnet coil may be correspondingly decreased. These general considerations apply as well to the modifications shown in Figs. 1, 2, and 3.

A convenient and efficient construction of the secondary element is that in which the combination of metals is effected by slotting or recessing the metal forming the faces of the element and applying another metal conductor in the slots thus formed. For example, in the disk form of secondary element shown in Figs. 4, 5 and 6 the construction may be varied to that form shown in Fig. 15, in which the disk 90 is provided with radial slots 91 in which are inserted copper bars 92, which are united at their inner and outer ends by copper rings 93 and 94. In this particular form of the secondary element the copper constitutes a closed circuit for the induced currents. In applying the same general principle of construction to the drum type of secondary element, as shown in Figs. 1, 2 and 3, the well known squirrel cage form of armature may be substituted for that hereinbefore described, with good effect.

In Figs. 7 and 8 there is shown an application of the invention which admirably adapts the same as a substitute for gearing for driving one shaft from another one parallel therewith. In this construction the electro-magnetic element, with its air gap, is similar to that shown in Figs. 4 and 5. 33 is the shaft, driven from a prime mover or other suitable source of power, said shaft having magnet 34 rigidly mounted thereon, said magnet being provided with pole faces 35, facing each other and forming an air gap 37. These pole faces, as shown, are continuous, but, if desired, the magnet may be constructed with separate isolated pole faces arranged opposite each other, as in Figs. 4 and 5. Magnet coil 36, mounted upon the central core of the magnet, when energized by suitable current, causes a magnet flux to be set up across the air gap 37. The disk 38, which constitutes the secondary element is conveniently mounted upon a central spider or equivalent support 39, which is fast upon shaft 40, which latter is the driven element. The shafts 33 and 40 are so located that said disk 38 projects within the air gap 37 in such manner as to cut the lines of force traversing the air gap, so that, when the magnet 34 is rotated with its shaft 33, and current is supplied to the coil 36, disk 38, with its connected shaft 40, is likewise caused to revolve, the speed of the latter depending upon the speed of said magnet 34, and the strength of the current flowing in magnet coil 36. The slip rings and coöperating elements for supplying current to the magnet coil 36 are not shown in this figure, but it will be understood that they are to be applied in substantially the same manner as shown in Fig. 1. It will also be observed that speed of the variation of shaft 40 may be effected by shifting the shafts toward or from each other, thereby causing a greater or less amount of the disk 38 to project within the air gap.

In all of the constructions heretofore described, instead of providing the magnets with alternate poles and blank spaces, practically the whole available area of the magnet may be used to constitute an air gap by making the poles on each side alternately of opposite polarity. This may be accomplished by providing a winding for each pole, adjacent poles on the same side being wound in opposite directions, and the central winding, as illustrated, being omitted.

Fig. 9 shows an adaptation of the invention for obtaining a change or variable speed in the driven shaft from a driving shaft running at a fixed speed. Referring to said figure, 41 is the driving shaft, and 42, 43 and 44 are electro-magnetic clutches or transmission mechanism of the type shown in Fig. 1, for example, with the pulley member 7 in each case replaced by a spur gear 48, 49 and 50, respectively. These gears are of gradually increasing size and mesh with correspondingly reduced gears 51, 52 and 53, fast upon the shaft 54. It will be apparent that when any one of the elements 42, 43 or 44 are energized by an electric current, it will cause the corresponding gear attached to its secondary element to be rotated, and thereby drive the shaft 54 at a corresponding speed, the other intermeshing gears running idly. By this means the shaft 54 may be driven at any desired speed by coupling the appropriate electro-magnetic transmission mechanism to shaft 41 by merely closing the appropriate circuit.

Fig. 10 illustrates the application of a series of electro-magnetic transmission mechanisms, of the general type shown in Fig. 7, for imparting variable speed to a parallel shaft. In this figure, 103 is the driving shaft which is rotated from a suitable source of power, upon which is rigidly mounted a series of electro-magnetic elements 100, 101, and 102, of the same general type as that shown in Fig. 7, but of successively diminishing diameters. With each of the elements 100, 101 and 102 coöperates a secondary element or disk 104, 105, and 106 which increase in size proportionately as the coöperating elements diminish. By energizing the coils of any one of the elements 100, 101, or 102, it will be apparent that the speed of shaft 107 may be varied accordingly.

The invention also finds a particularly advantageous application as a substitute for the ordinary type of differential transmission gear, such, for example, as is usually employed in driving automobiles. Such an application is illustrated in Fig. 11, in which 55 is the main shaft driven from the engine or other prime mover, and has mounted thereon electro-magnetic power transmission mechanisms 56 and 57 of the type hereinbefore described, and, as illustrated, having the same general characteristics of construction and operation as the form shown in Figs. 1, 2 and 3. The gears 58 and 59, which are connected to the secondary elements of the respective electro-magnetic mechanisms mesh with gears 60 and 61, respectively, on shafts 62 and 63. By regulating the current delivered to the magnet coils of the elements 56 and 57, it will be apparent that any relative speed may be maintained as between the driven axles 62 and 63. If said shafts 62 and 63 are connected to drive the wheels of an automobile, for example, the proper regulation of the relative speeds of the shafts 62 and 63 may be made to exactly compensate for the difference in speeds of the inner and outer wheels of the automobile when turning a corner, and thereby avoid the slip of one or both of the wheels of the vehicle, which is a prevalent evil in automobiles employing the ordinary type of differential gear. The accurate regulation of the current supplied to the coils of elements 56 and 57 may be effected by connecting the rheostats by means of which the current strength is regulated, to the steering gear of the automobile in such manner that when the steering gear is operated to turn the machine, the current to the transmission mechanism controlling the outside wheel will be increased and that to the corresponding mechanism controlling the inside wheel will be appropriately diminished, so that the relative speeds of the two wheels will be exactly regulated as to avoid slipping of the wheels. Of course, the tendency of the automobile wheels to slip will be more or less obviated by the flexibility of the electro-magnetic clutches, themselves, as the secondary elements are capable of a certain amount of slipping themselves, without interposing any wear or shock on the rest of the mechanism so that even if the current supplied to the magnets is not accurately regulated to compensate for the turning of the machine, the wheels of the latter will nevertheless take up a differential speed incident to the turning movement, without imposing any strain on the driving mechanism, and with little or no tendency of the vehicle wheels to slip.

Fig. 12 illustrates the application of several prime movers, to drive a secondary mover and thereby to increase or regulate the power imparted to the latter. In this figure, 64 is a rotary disk of the same general type as that employed in Figs. 7 and 8 which is brought into operative relation with multiple magnetic members 64' similar to 34, shown in Figs. 7 and 8, all of which are positively driven by extraneous power. When all the magnets in the elements 64' are energized, all of said elements will exercise a driving effect upon the common secondary mover 64, and, correspondingly, if one or more of the elements 64' are deënergized, the speed or power developed in the element 64 will be accordingly diminished.

In Fig. 13 there is illustrated a further modification of the same idea, except in this arrangement the several electro-magnetic elements 110 are mounted upon a common shaft 111 and coöperate with secondary mover disks 112, fast upon shaft 113. By energizing all of the electro-magnetic elements 110, maximum power may be transmitted to shaft 113, and, by deënergizing one or more of the said magnetic elements, the power transmitted to said shaft 113 will be correspondingly diminished.

In Fig. 14, there is shown an application of the invention as a reversing mechanism. For this purpose there are employed on shaft 65 two electro-magnetic elements 66 and 69. Upon the driven shaft 67 there is one secondary mover disk 68 coöperating with magnetic element 66 and one electro-magnetic element 72. Running in the air gaps of magnetic elements 69 and 72 is a disk 71 mounted upon a shaft 70. When magnetic element 66 is energized it will drive shaft 67 through the intermediacy of disk 68 in one direction. When element 69, however, is energized, it will inductively effect disk 71 and cause the same to rotate, and said disk will concurrently drive the magnetic element 72, when the latter is energized causing the same to rotate and drive shaft 67 in a reverse direction.

From the foregoing it will be apparent, that, inasmuch as the elements of the electromagnetic inductive system, forming the basis of this invention, exercise a mutual pull or stress, one on the other, if one of the elements be relatively fixed or restrained more or less, it will exercise a positive braking effect upon the other, so that the system may be used to retard or restrain movement, in which aspect it presents another important phase of power transmission. By fixing one of the elements heretofore described in the various modifications, as primary and secondary mover, or restraining the movement thereof by some positive means, the fixed element will act as a retarding medium on the moving element, when current is turned onto the magnet. This apparatus will not stop movement of the element to be braked, entirely, but will so far retard the same as to admit of its being positively stopped by a mechanical brake of much less power than would be necessary to arrest its movement if the retarding action of the coöperating element were not present. The application of the invention as a brake or retarding mechanism has not been specifically illustrated, but it will be clearly understood that any of the forms of the invention heretofore described may be converted into a brake or retarding apparatus by merely fixing or limiting the movement of one of the electro-magnetic elements, to wit, the element carrying the electro-magnet, or the coöperating disk or drum inductor element.

It will be apparent from the foregoing that the invention is capable of general application wherever clutches, gearing, belting, brakes, and the like might be employed and by selecting a proper form of electro-magnectic transmitting mechanism, the desired conditions of power or speed transmission may be attained, accurate regulation may be effected, and the elements of wear, vibration and shock entirely eliminated.

Many particular advantageous applications of the invention might be enumerated, but, in passing, it may be remarked that in the operation of steam turbines, the invention will be most effective, inasmuch as, owing to the high speed of rotation of the turbines, no form of gearing involving mechanical contact is found satisfactory for transmitting power from the turbine shaft to other moving elements. By employing an electro-magnetic transmission gear or clutch, constructed in accordance with this invention and arranged to meet the particular circumstances of the case, the speed developed by the turbine may be properly reduced for the operation of machinery. The invention also provides an efficient mode of reversing machinery driven by steam turbines, as, for example, by employing an electro-magnetic reversing gear of the type shown in Fig. 14, in which shaft 65 will be driven directly by the turbine.

What I claim as my invention is:—

1. Power transmission mechanism comprising a positively driven primary element and a secondary element driven therefrom, said primary and secondary elements being connected respectively to a main shaft and a counter-shaft out of alinement therewith and forming an electro-magnetic inductive system without mechanical connection.

2. Power transmission mechanism comprising a positively driven primary element mounted on a rotatable main shaft, and a secondary element mounted on a rotatable counter-shaft, out of alinement with the main shaft, and driven therefrom, said primary and secondary elements forming an electro-magnetic inductive system, involving a magnetic circuit including an air gap, and an electric conductor interposed in said air gap.

3. Power transmission mechanism comprising a positively driven primary element mounted on a rotatable main shaft, and a secondary element mounted on a rotatable counter-shaft, out of alinement with the main shaft and driven therefrom, said primary and secondary elements forming an electro-magnetic inductive system involving a magnet having an air gap, and an energizing coil for said magnet, and an electric conductor interposed in said air gap.

4. Power transmission mechanism comprising a positively driven primary element, and a secondary element driven therefrom, said primary and secondary elements forming an electro-magnetic inductive system involving a magnet having an air gap, an energizing coil for said magnet, and a slotted electric conductor interposed in said air gap.

5. Power transmission mechanism comprising a positively driven primary element, and a secondary element driven therefrom, said primary and secondary elements forming an electro-magnetic inductive system involving a magnet having an air gap, an energizing coil for said magnet, and an electric conductor interposed in said air gap, said electric conductor being provided with slots transverse to the direction of its movement.

6. Power transmission mechanism comprising a positively driven primary element, and a secondary element driven therefrom, said primary and secondary elements forming an electro-magnetic inductive system involving a magnet having an air gap, an energizing coil for said magnet, and an electric conductor interposed in said air gap, said conductor having a section of increased conductivity at one or both ends of the portion interposed in the air gap.

7. Power transmitting mechanism comprising a plurality of positively driven primary elements, a secondary element rotatively driven directly from one of said primary elements, an independent secondary element rotatively driven from another of said primary elements, a tertiary element rotatively driven from said independent secondary element, the respective sets of primary and secondary and primary, secondary and tertiary elements forming separately controlled electro-magnetic induction system for reversing the direction of the ultimate driven member.

8. Power transmission mechanism comprising a positively driven rotatory primary element, a rotatory secondary element driven therefrom, said primary and secondary elements forming an electro-magnetic induction system, involving a magnet having an air gap, an energizing coil for said magnet, and an electric conductor interposed in said air gap and formed as a rotor of iron or the like provided with recesses and connected conductors of superior conductivity in said recesses.

9. The combination in a power transmitting mechanism, of a positively driven power shaft, two independent shafts adapted to be driven therefrom, and electro-magnetic inductor mechanisms for transmitting power between the first-mentioned shaft and the latter shafts, each of said electro-magnetic transmitting mechanisms comprising a primary element mounted on the positively driven shaft, and a secondary element on one of the independent shafts, and each of said transmitting mechanisms involving a magnet having an air gap, an energizing coil for said magnet and an electric conductor interposed in said air gap and means for supplying and regulating current to the respective magnet coils.

10. Power transmission mechanism comprising a positively driven primary element, and a secondary element driven therefrom, said primary and secondary elements being connected respectively to a main shaft and a counter-shaft out of alinement therewith and forming a magnetic inductive system, without mechanical connection.

11. The combination in a power transmitting mechanism of a positively driven power shaft, a counter shaft out of alinement therewith, and electro-magnetic induction mechanism transmitting power between said shafts, in combination with an idler operative related to the said shafts and forming one element of the electro-magnetic induction mechanism, whereby the direction of drive of the counter-shaft may be reversed.

12. The combination with a positively driven power shaft, of a driven shaft, and a plurality of electro-magnetic induction mechanisms transmitting power between said shafts, the respective power transmission mechanisms including speed transmission gearings of relatively different ratios, whereby the speed of transmission may be varied.

13. The combination with a positively driven power shaft, of a driven shaft and a plurality of electro-magnetic induction mechanisms transmitting power between said shafts, the respective power transmission mechanisms including speed transmission gearings of relatively different ratios, and means for varying the power of the electro-magnetic induction mechanisms at will, whereby the speed of transmission may be gradually varied.

14. Power transmission mechanism comprising a positively driven primary element, a secondary element driven therefrom, said primary and secondary elements forming an electro-magnetic induction system, involving an inducing magnet having opposing polar faces of opposite signs, and an induced element made up of a material having good electrical conductivity reinforced by a material having good magnetic permeability, said induced element being interposed in the air gap between the polar faces.

15. Power transmission mechanism comprising a positively driven primary element, a secondary element driven therefrom, said primary and secondary elements forming an electro-magnetic induction system, involving an inducing magnet having opposing polar faces of opposite signs and an induced element made up of a supporting structure of material having high magnetic permeability on the surface of which is secured a series of connected conducting strips, said induced element being interposed in the air gap between the polar faces.

16. Power transmitting mechanism comprising a positively driven primary element, a secondary element driven therefrom, said primary and secondary elements forming an electro-magnetic induction system, involving an inducing magnet having an air gap and a composite induced element moving in said air gap and made up of a material having good electrical conductivity and a material having good magnetic permeability.

17. Power transmitting mechanism comprising a positively driven primary element, a secondary element driven therefrom, said primary and secondary elements forming an electro-magnetic induction system, involving an inducing magnet having an air gap and an induced element moving in said air gap made up of a supporting structure of good magnetic permeability on the surface of which is secured a series of strips of copper connected together.

In testimony whereof I affix my signature, in presence of two witnesses.

AUGUSTUS JESSE BOWIE, Jr.

Witnesses:
C. R. HAMMERSMITH,
FLORA HALL.